United States Patent
Strock et al.

(10) Patent No.: US 8,802,199 B2
(45) Date of Patent: Aug. 12, 2014

(54) METHOD FOR MICROSTRUCTURE CONTROL OF CERAMIC THERMAL SPRAY COATING

(75) Inventors: Christopher W. Strock, Alfred, ME (US); Charles G. Davis, Sanford, ME (US)

(73) Assignee: United Technologies Corporation, Hartford, CT (US)

( * ) Notice: Subject to any disclaimer, the term of this patent is extended or adjusted under 35 U.S.C. 154(b) by 204 days.

(21) Appl. No.: 12/650,650

(22) Filed: Dec. 31, 2009

(65) Prior Publication Data

US 2012/0189763 A1 Jul. 26, 2012

Related U.S. Application Data

(62) Division of application No. 11/197,853, filed on Aug. 4, 2005, now abandoned.

(51) Int. Cl.
| | | |
|---|---|---|
| *C23C 4/02* | (2006.01) | |
| *C23C 4/04* | (2006.01) | |
| *C23C 4/12* | (2006.01) | |
| *C23C 4/06* | (2006.01) | |
| *C23C 28/00* | (2006.01) | |
| *F01D 5/28* | (2006.01) | |
| *F01D 11/12* | (2006.01) | |

(52) U.S. Cl.
CPC ... *C23C 4/02* (2013.01); *C23C 4/06* (2013.01); *C23C 4/12* (2013.01); *C23C 4/127* (2013.01); *C23C 28/345* (2013.01); *C23C 28/3215* (2013.01); *F01D 5/288* (2013.01); *F01D 11/122* (2013.01); *F05D 2240/11* (2013.01); *F05D 2300/21* (2013.01); *F05D 2230/90* (2013.01); *Y02T 50/672* (2013.01)

USPC ............. 427/454; 427/8; 427/446; 427/535; 427/554; 427/557; 427/314; 427/318

(58) Field of Classification Search
CPC ........................................................ C23C 4/02
USPC .......................................................... 427/454
See application file for complete search history.

(56) References Cited

U.S. PATENT DOCUMENTS

| | | |
|---|---|---|
| 3,528,861 A | 9/1970 | Elam et al. |
| 3,542,530 A | 11/1970 | Talboom, Jr. et al. |

(Continued)

FOREIGN PATENT DOCUMENTS

| | | |
|---|---|---|
| EP | 1752553 A2 | 2/2007 |
| JP | 2001335915 | 12/2001 |
| JP | 2001335915 A | 12/2001 |

OTHER PUBLICATIONS

English translation of Japan 2001-335915, published in Japanese Dec. 2001.*

(Continued)

*Primary Examiner* — Katherine A Bareford
(74) *Attorney, Agent, or Firm* — Bachman & LaPointe, P.C.

(57) ABSTRACT

An apparatus for applying segmented ceramic coatings includes means for supporting and moving one or more substrates; one or more heat sources disposed proximate to one or more substrates, wherein at least one of the heat sources is positioned to apply a heat stream to pre-heat a thermal gradient zone on a surface of a substrate; a material deposition device disposed proximate to one or more heat sources, wherein the material deposition device is positioned to deposit a material on a deposition area located behind the thermal gradient zone on the surface; and means for monitoring a surface temperature of one or more substrates.

10 Claims, 6 Drawing Sheets

(56) References Cited

U.S. PATENT DOCUMENTS

| | | | |
|---|---|---|---|
| 3,649,225 | A | 3/1972 | Simmons, Jr. |
| 3,676,085 | A | 7/1972 | Evans et al. |
| 3,754,903 | A | 8/1973 | Goward et al. |
| 4,078,922 | A | 3/1978 | Magyar et al. |
| 4,297,388 | A | 10/1981 | Kumar et al. |
| RE32,121 | E | 4/1986 | Gupta et al. |
| 4,585,481 | A | 4/1986 | Gupta et al. |
| 4,897,283 | A | 1/1990 | Kumar et al. |
| 5,688,564 | A | 11/1997 | Coddet et al. |
| 5,897,921 | A * | 4/1999 | Borom et al. .................. 427/454 |
| 6,102,656 | A | 8/2000 | Nissley et al. |
| 6,197,386 | B1 * | 3/2001 | Beyer et al. .................. 427/450 |
| 6,482,476 | B1 | 11/2002 | Liu |
| 6,537,605 | B1 * | 3/2003 | Kirchner et al. .................. 427/8 |
| 2003/0129316 | A1 * | 7/2003 | Darolia et al. ................. 427/402 |

OTHER PUBLICATIONS

European Search Report for EP06254094.3, dated Nov. 3, 2009.
European Office Action for EP Patent Application No. 062540943, dated Feb. 25, 2013.
European Office Action for EP Patent Application No. 10006996.2, dated Feb. 4, 2013.
European Search Report for EP Patent Application No. 10006996.2, dated Sep. 8, 2011.
European Office Action for EP Patent Application No. 062540943, dated Oct. 18, 2011.

\* cited by examiner

METHOD FOR MICROSTRUCTURE CONTROL OF CERAMIC THERMAL SPRAY COATING

CROSS REFERENCE TO RELATED APPLICATIONS

This application is a divisional application of U.S. application Ser. No. 11/197,853 filed on Aug. 4, 2005 now abandoned.

FIELD OF USE

This invention relates to thermal spray coatings and, more particularly, to controlling crack formation in ceramic coatings.

BACKGROUND OF THE INVENTION

Modern gas turbine engines, particularly those used in aircraft, operate at high rotational speeds and high temperatures for increased performance and efficiency. The turbine of a modern gas turbine engine is typically of an axial flow design and includes a plurality of axial flow stages. Each axial flow stage comprises a plurality of blades mounted radially at the periphery of a disk which is secured to a shaft. A plurality of duct segments surrounds the stages to limit the leakage of gas flow around the tips of the blades. These duct segments are located on the inner surface of a static housing or casing. The incorporation of the duct segments improves thermal efficiency because more work may be extracted from gas flowing through the stages as opposed to leaking around the blade tips.

Although the duct segments limit the leakage of gas flow around the blade tips, they do not completely eliminate the leakage. It has been found that even minor amounts of gas flow around the blade tips detrimentally affect turbine efficiency. Thus, gas turbine engine designers go to great lengths to devise effective sealing structures. These structures generally include a coated duct segment in combination with a blade tip coating which renders the tips resistant to wear. In operation, the tips provide sealing by cutting into the coating on the duct segment. Thereby preventing damage to blades and resulting in minimum possible tip clearances and air leakage.

Unfortunately current duct segment coatings, which are typically ceramic, suffer from excessive material loss as a result of erosion or spalling. In general, erosion is the wearing away of coating material due to factors such as abrasion and corrosion. Erosion often results from particle impingement during engine operation. Spalling or spallation is typically caused by delamination cracking at the ceramic-metal interface resulting from thermal stress and the aggressive thermal environment. Spalling is essentially piecemeal coating loss consisting of many small coherent volumes of coating material.

The coating losses due to erosion and spallation result in large part to microcracks present in the segment ceramic coating. Microcracks formed parallel to the substrate surface, or horizontal microcracks, causes the coating to spall off when subjected to the above mentioned operating conditions and environment. In contrast, vertically oriented microcracks bolster the coating's strain tolerance which prolongs the coating's service life. The mechanism of microcrack formation in segmented ceramic coatings is thermally induced stress. Thermal gradients are induced into the coating in a cyclic manner during coating deposition. These gradients are controlled to allow coating to be applied to a surface with no open cracks, then as each thin layer is built up and subsequently cooled, surface shrinkage produces stress levels required for cracks to propagate to the surface. Reheating of the surface then closes the cracks prior to the next thin layer of coating being applied. The relative tendency of cracks to propagate through their thickness or parallel to the substrate is dependent upon the thickness of the layers that are applied before crack propagation is induced.

Ceramic coating loss increases blade tip clearance and thus is detrimental to turbine efficiency, as well as detrimental to the blades themselves. For example, the blades may become damaged due to the increased temperature at which the engine must then operate to make up for lost thrust. Such performance losses may be prevented by improving the quality of the segmented ceramic coating.

Presently, U.S. Pat. No. 6,102,656 ('656 patent) discloses one such method of applying a segmented ceramic coating in an effort to improve the ceramic coating. Applying ceramic coatings upon substrates is an automated process whereby the substrate is placed in a fixture that rotates about an axis or moves in a linear direction along a conveyor for example.

As described in the '656 patent, a substrate 10 may move in a direction indicated by an arrow 12 in such an automated process (see FIG. 1). A plasma torch apparatus 14 moves in a direction opposite substrate 10 as indicated by an arrow 26 and emits a plasma plume 16. Plasma plume 16 is defined by a pair of solid lines that is directed towards a surface 18 of substrate 10. Plasma torch apparatus 14 includes a ceramic (or powdered) material feeder (not shown) that emits a quantity of ceramic material 20 in a direction indicated by an arrow 28 into plasma plume 16. Ceramic material 20 becomes entrained within plasma plume 16 and is carried towards surface 18. As illustrated, plasma plume 16 comprises a much broader spray pattern than ceramic material 20 such that a deposition area 22 forms within a heated area 24 on surface 18.

The '656 patent relies upon a high power level and gas flow utilized in conjunction with a slow relative motion of the plasma torch to the parts (substrate 10) to produce the surface heating by the plasma and air cooling necessary to achieve vertical microcracking. These conditions represent a compromise between equipment capability, efficiency and microstructural characteristics of the ceramic coating.

The current process may not always exert adequate active control of the thermal gradients and thermal cycling that occurs in the spray process. The balance between vertical crack formation and horizontal crack formation is very difficult to control and occurs very randomly. As depicted in FIG. 1, the heating zone 24 created by the plasma torch is larger than the deposition area 22, and extends further over the substrate in the direction where deposition has just taken place than where deposition is about to take place, i.e., the heated area 24 extends further to the left of deposition area 22 than to the right of deposition area 22 in FIG. 1. Due to this relationship between surface heating and deposition location, only a moderate driving force is present to propagate through thickness cracks. As a result, shrinkage occurs in more than one direction and thermal cycling causes cracks to form horizontally within the plane of the coating as well as vertically through the coating. The horizontal cracks that are parallel to the substrate do not improve the coating's strain tolerance and durability; these cracks actually cause the coating to spall off.

Consequently, there exists a need for an improved method for controlling the crack formation in segmented ceramic coatings, thereby improving process repeatability and consistency of coating performance, as well as for facilitating an independent control of cracking and porosity.

SUMMARY OF THE INVENTION

In accordance with the present invention, a method of forming a segmented ceramic spray coating on a substrate broadly comprises (1) providing one or more heat sources disposed proximate to a substrate; (2) depositing optionally a quantity of a bond coat material into a heat stream of the one or more heat sources and onto a deposition area of a surface of the substrate to form an optional bond coat layer; (3) depositing optionally a quantity of a first ceramic material into the heat stream of the one or more heat sources and onto the deposition area of the surface to form an optional first ceramic material layer upon the optional bond coat layer; (4) applying the heat stream to a preheated thermal gradient zone located in front of the deposition area of a surface of the first ceramic material layer to expand the optional first ceramic material; (5) depositing one or more quantities of additional ceramic material into the heat stream upon the pre-heated, expanded optional first ceramic material layer to form one or more additional layers of ceramic material; (6) cooling one or more additional layers of ceramic materials to promote vertical crack propagation; and (7) applying the heat stream to the pre-heated thermal gradient zone of a surface of the one or more additional layers of ceramic material to expand the additional ceramic material. Steps 5 through 7 may be repeated one or more times, if desired.

In accordance with the present invention, an apparatus for applying segmented ceramic coatings broadly comprises means for supporting and moving one or more substrates; one or more heat sources disposed proximate to the one or more substrates, wherein at least one of the heat sources is positioned to apply a heat stream to pre-heat a thermal gradient zone on a surface of a substrate; a material deposition device disposed proximate to the one or more heat sources, wherein the material deposition device is positioned to deposit a material on a deposition area located behind the thermal gradient zone on the surface; and means for monitoring a surface temperature of one or more substrates.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

To improve the quality of ceramic coatings, the methods described herein propose to increase the amount of vertical microcracking present within the coating microstructure. Vertical microcracking provides strain tolerance, which prolongs the coating's service life.

The terms "equilibrium", "equilibrate" and their related forms are intended to convey the establishment of temperatures and thermal gradients between the substrate surface and successive coating layers being deposited thereupon in order to promote vertical crack propagation in the coating. During the processes described herein, a repeated cycle of heat flux occurs within the coating layer(s) for a short duration of time, dynamically heating the coating layer surface and causing thermal gradients due to the heat capacities and conductivities of the materials. The thermal gradients are allowed to dissipate over a period of time, for example, as little as a fraction of a second, which causes shrinkage of the deposited coating layers and ratchets the vertical cracks towards the surface of the coating layers. Throughout the methods described herein, the cycle of heat flux repeats over and over again as successive coatings layers are deposited.

Figure 1:
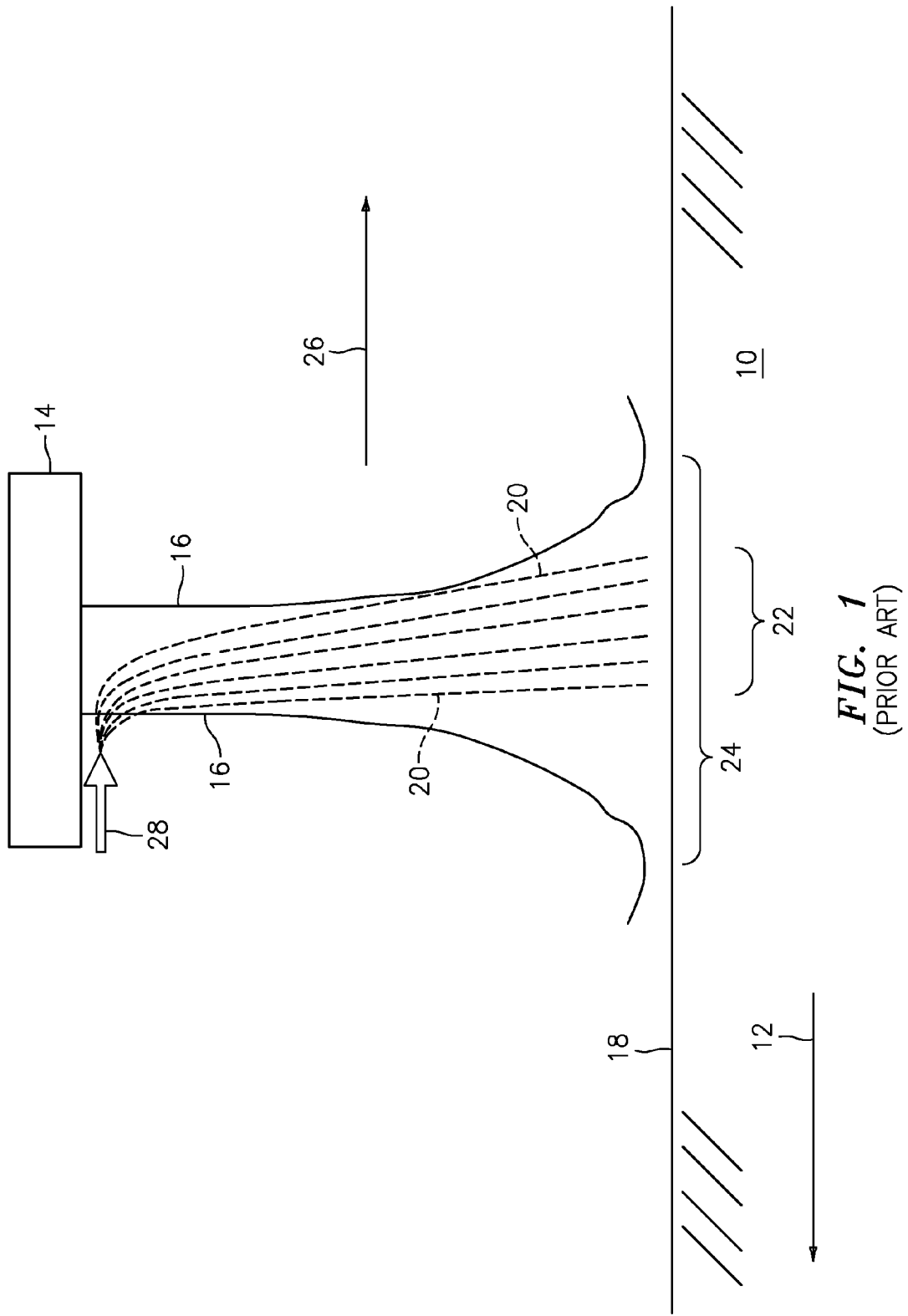
FIG. 1 is a representation of an existing system for applying a segmented ceramic spray coating.
Figure 2:
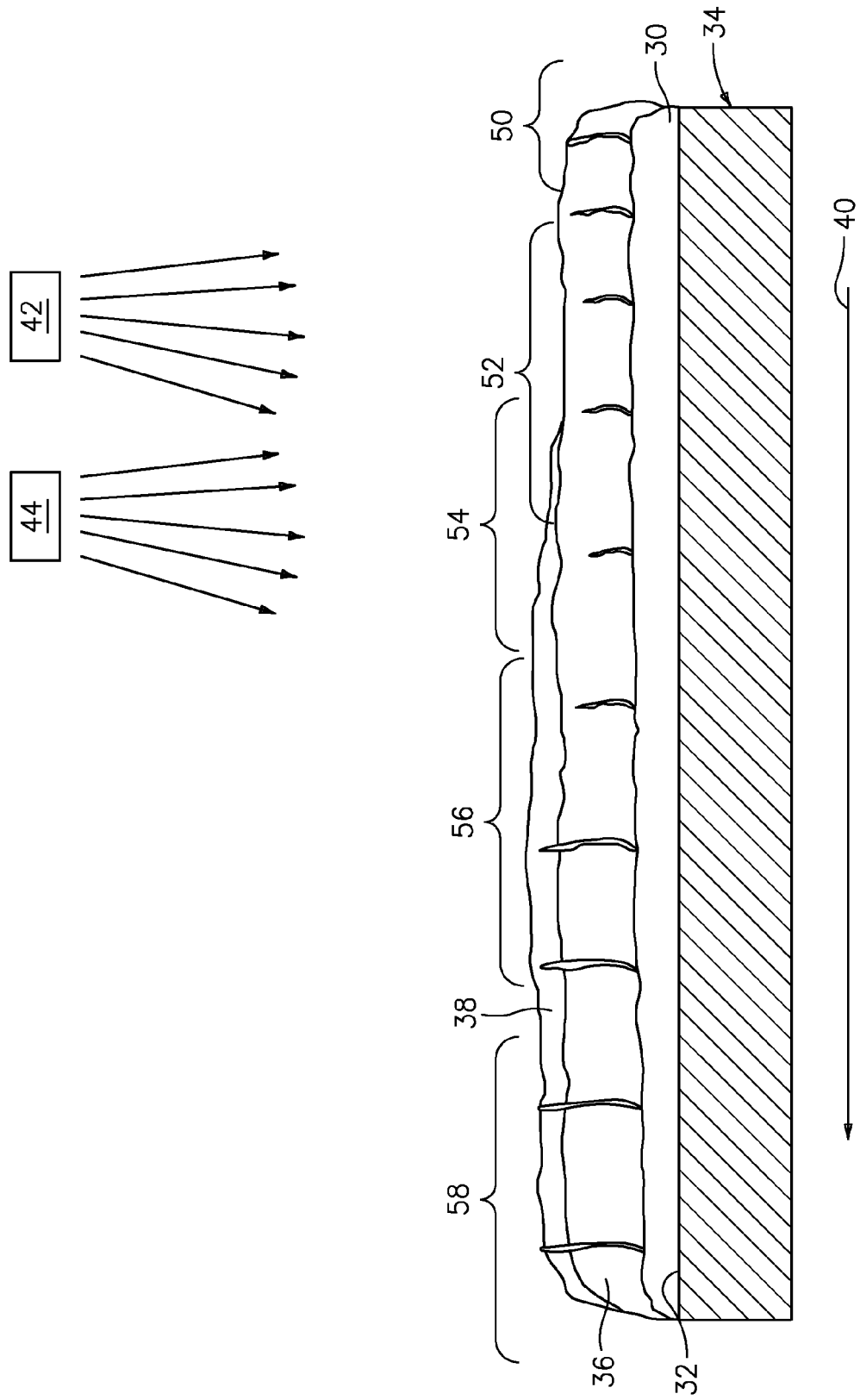
FIG. 2 is a representation showing how to apply a segmented spray coating to achieve a vertical microcrack microstructure within the coating.

Referring now to FIG. 2, by utilizing the material properties of thermal expansion, heat capacity, and conductivity of the coating and substrate, thermal gradients can be set up to control cracking characteristics. Unlike the process of the prior art illustrated in FIG. 1, these gradients are imposed by momentary heating of the coating surface just prior to and/or during each pass of one or more spray torches, or other heat sources, over the substrate during the deposition event. The thermal gradient causes expansion of the coating surface relative to the substrate, which closes the cracks without re-melt while ceramic deposition is taking place. After each layer of coating is deposited the gradient is allowed to dissipate, the surface contracts and goes into tension causing propagation of the cracks to the surface. The surface heating, coating, cooling, and crack propagation cycles are repeated until the desired coating thickness is achieved. Benefits of this type of control include improved repeatability of microstructure formation and resultant properties, and independent control of cracking and porosity.

As illustrated in FIG. 2, the coating system described herein generally comprises a bond coat layer 30 deposited upon a surface 32 of a substrate 34, and one or more successively applied ceramic coating layers 36, 38 deposited upon bond coat layer 30. Prior to deposition, substrate 34 may be cleaned to remove contaminants using any one of or a combination of conventional methods as is understood by one of ordinary skill in the art. For example, aluminum oxide grit blasting may be utilized to clean substrate 34. As substrate 34 moves in a direction indicated by an arrow 40, a heat source 42 may apply heat to at least a portion of surface 32 disposed ahead of the portion of surface 32 that is being coated by a thermal spray deposition device 44. Heat source 42 raises the temperature of surface 32, or surface 32 and a deposited layer of coating, e.g., layers 30, 36, 38, prior to depositing a layer of coating thereon to ensure adequate thermal cycling and cause vertical crack propagation in the coating.

For purposes of illustration, and not to be taken in a limiting sense, the coating system of FIG. 2 may comprise several areas that serve to illustrate thermal gradients and crack propagation described herein. Prior to heating, a low thermal gradient area 50 may initially be present where vertical cracks have propagated to the surface of the deposited layer(s). As substrate 34 moves, heat source 42 elevates the surface temperature of low thermal gradient area 50 to form surface heating area 52. At surface heating area 52, the elevated temperature induces a thermal gradient causing the surface to expand and close existing cracks therein. Substrate 34 continues moving and surface heating area 52 becomes exposed to thermal spray deposition device 44. Device 44 deposits another successive layer 38 of coating material, within coating deposition area 54, upon existing layers 30, 36 and/or surface 32. The fresh coating material 38 covers the expanded surface previously described as surface heating area 52.

As substrate 34 continues moving in the direction of arrow 40 and away from heat source 42 and deposition device 44, the successively applied coating layers 30, 36, 38 begin cooling to form a surface cooling area 56. Vertical cracks begin propagating to the surface that is exposed to atmosphere to relieve tensile stresses as the temperatures between the newly deposited coating layer 38 and existing coating layers 30, 36 equilibrates. Substrate 34 continues moving while layer 38 continues cooling to form a low thermal gradient area 58 where vertical cracks propagate to the surface that is exposed to the atmosphere through layers 30, 36 and/or 38.

Optionally, a bond coat 30 of a MCrAlY material or other suitable material may be applied to the substrate 34. MCrAlY refers to known metal coating systems in which M denotes nickel, cobalt, iron, or mixtures thereof; Cr denotes chromium; Al denotes aluminum; and Y denotes yttrium. MCrAlY materials are often known as overlay coatings because they are applied in a predetermined composition and do not interact significantly with the substrate during the deposition process. For some non-limiting examples of MCrAlY materials see U.S. Pat. No. 3,528,861 which describes a FeCrAlY coating as does U.S. Pat. No. 3,542,530. In addition, U.S. Pat. No. 3,649,225 describes a composite coating in which a layer of chromium is applied to a substrate prior to the deposition of a MCrAlY coating. U.S. Pat. No. 3,676,085 describes a CoCrAlY overlay coating while U.S. Pat. No. 3,754,903 describes a NiCoCrAlY overlay coating having particularly high ductility. U.S. Pat. No. 4,078,922 describes a cobalt base structural alloy which derives improved oxidation resistance by virtue of the presence of a combination of hafnium and yttrium. A preferred MCrAlY bond coat composition is described in U.S. Pat. No. Re. 32,121, which is assigned to the present Assignee and incorporated herein by reference, as having a weight percent compositional range of 5-40 Cr, 8-35 Al, 0.1-2.0 Y, 0.1-7 Si, 0.1-2.0 Hf, balance selected from the group consisting of Ni, Co and mixtures thereof. See also U.S. Pat. No. 4,585,481, which is also assigned to the present Assignee and incorporated herein by reference.

This MCrAlY bond coat 30 may be applied by any method capable of producing a dense, uniform, adherent coating of desired composition. Such techniques may include, but are not limited to, sputtering, electron beam physical vapor deposition, high velocity plasma spray techniques (HVOF, HVAF), combustion processes, wire spray techniques, laser beam cladding, electron beam cladding, etc. In the high velocity plasma spray technique, a spray torch may operate in a vacuum chamber at a pressure of less than about 60 torr (60 mm Hg) or in another suitable atmosphere, such as air. If a vacuum chamber is employed, the substrate may be heated to a temperature of about 1500° F. (816° C.) to about 1900° F. (1038° C.) If an air atmosphere is used, the substrate temperature may be maintained at less than about 600° F. (316° C.)

The particle size for the bond coat 30 may be of any suitable size, and in embodiments may be between about 15 microns (0.015 mm) and about 60 microns (0.060 mm) with a mean particle size of about 25 microns (0.025 mm). The bond coat 30 may be applied to any suitable thickness, and in embodiments may be about 5 mils (0.127 mm) to about 10 mils (0.254 mm) thick. In some embodiments, the thickness may be about 6 mils (0.152 mm) to about 7 mils (0.178 mm) thick.

Segmented ceramic coatings 36, 38 may be applied on the bond coat 30 or directly on the substrate 34. The ceramic coatings may comprise one or more ceramic layers 36, 38 which are individually applied to any suitable thickness. Some embodiments may have an overall thickness of about 20 mils (0.508 mm) to about 150 mils (3.81 mm). Other embodiments may have an overall thickness of about 50 mils (1.270 mm). The ceramic coatings may be produced in one or more continuous spray processes as described herein.

Figure 3:
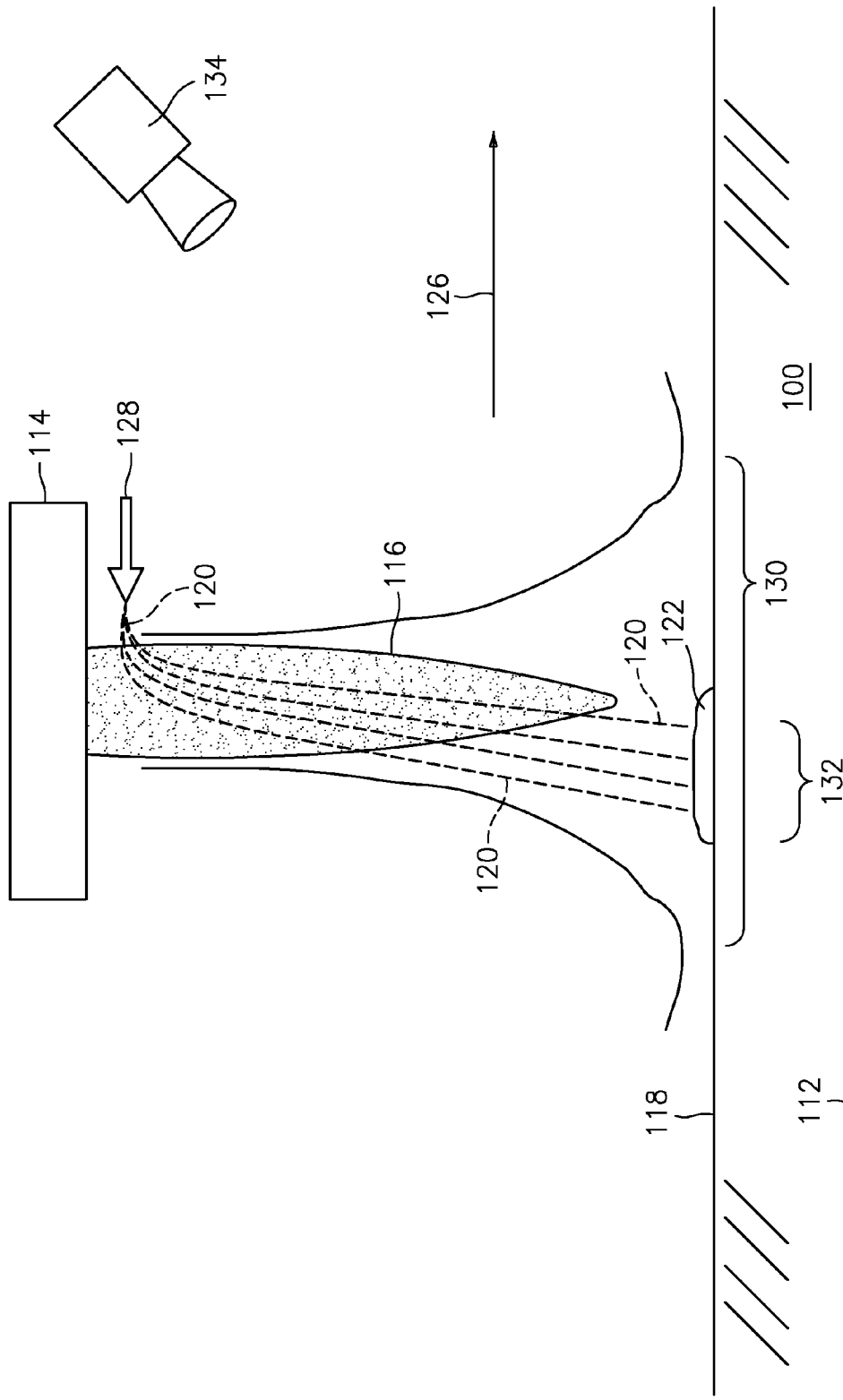
FIG. 3 is a representation of one embodiment of a system for applying a ceramic spray coating of the present invention.

Referring now to FIG. 3, a system of the present invention is illustrated. A substrate 100 may move in a direction indicated by an arrow 112 in an automated process as is understood by one of ordinary skill in the art. A spray torch apparatus 114 may remain stationary and apply heat to substrate 100, or spray torch apparatus 114 may move in a direction opposite that of substrate 100 as indicated by an arrow 126. The spray torch apparatus 114 emits a heated gas plume 116 that may contain ionized species. It is contemplated that the type of heat source utilized will determine whether the heat source moves or remains in place relative to the motion of the substrate 100. However, the heat source is preferably positioned to pre-heat a thermal gradient area located before the deposition area 132 on the surface 118 of the substrate 100 when applying the ceramic material. A representative torch may include, but is not limited to, an air plasma spray gun such as the 3MB® commercially available from Sulzer Metco, Inc., Westbury, N.Y.

Once the optional bond coat layer 122 has been applied, a ceramic (or powdered) material feeder (not shown) injects a quantity of ceramic material 120 in a direction indicated by an arrow 128 into plasma plume 116. The direction of the injected ceramic material 120 is preferably the same as the movement of substrate 100 and opposite that of any movement of plasma torch apparatus 114. Ceramic material 120 becomes entrained within plasma plume 116 and is carried towards surface 118.

Ceramic material 120 is preferably injected with a force sufficient to become entrained and carried by the latter portion or the far left half of plasma plume 116. By controlling the direction and velocity of the injected ceramic material 120, the process in turn effectively exercises control over the location of the deposition of ceramic material 128 onto surface 118, for example, a ceramic material deposition area 132. Plasma plume 116 creates a heated area 130 when striking surface 118 that encompasses ceramic material deposition area 132 and effectively preheats surface 118 prior to the initial deposition or re-deposition of ceramic material 120.

Typically, as thermal cycling occurs, deposited ceramic material begins cooling and shrinking in several directions. When another layer of ceramic material is deposited, the heat input from the ceramic material splats cause cracks within the plane of the coating. Due to the shrinkage and varying thermal gradients experienced by the coating the microcracks being formed may be non-vertical, i.e., the microcracks may be parallel to the surface 118 of substrate 100.

Preheating surface 118 or a deposited layer, i.e., bond coat layer 122, can raise and equilibrate the temperature surrounding ceramic material deposition area 132 and reduce the differences in the temperature, that is, the thermal gradients, existing between surface 118 and/or deposited layers and ceramic material being deposited in area 132. Shrinkage of the deposited ceramic material will become less severe relative to the pre-existing layers of ceramic, resulting in lower stresses between coating layers and a lower propensity for cracking parallel to the substrate. In addition, if the preheating occurs fast enough, a sufficient thermal gradient will be induced between the coating surface 118 and substrate 100 to result in within plane stresses that will cause cracks to propagate perpendicular to the substrate upon dissipation of those gradients. The resulting deposited ceramic material layer will more likely form the desired vertically microcracked structure.

To ensure preheating occurs and thermal gradients are controlled, a monitoring device 134 may be employed to measure the temperature of surface 118 throughout the deposition process. Suitable monitoring devices include but are not limited to infra-red cameras, optical pyrometers, thermocouples, combinations comprising at least one of the foregoing devices, and the like. Monitoring device 134 may provide data concerning the substrate or coating surface temperatures to an operator, a PLC, an open loop control in combination with passive process controls, or a computer controlling the automated deposition process, etc.

Figure 4:
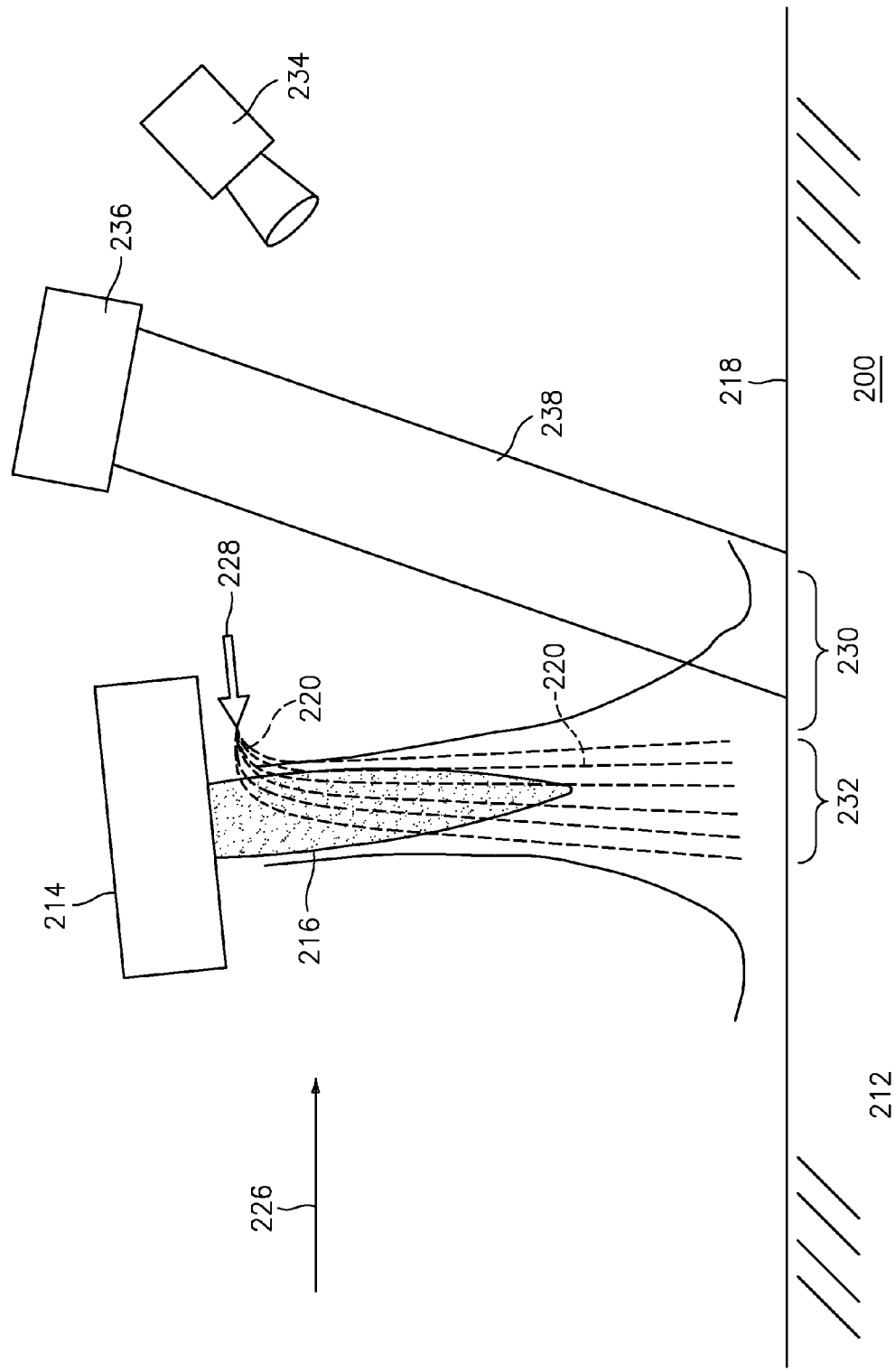
FIG. 4 is a representation of another embodiment of a system for applying a ceramic spray coating of the present invention.
Figure 5:
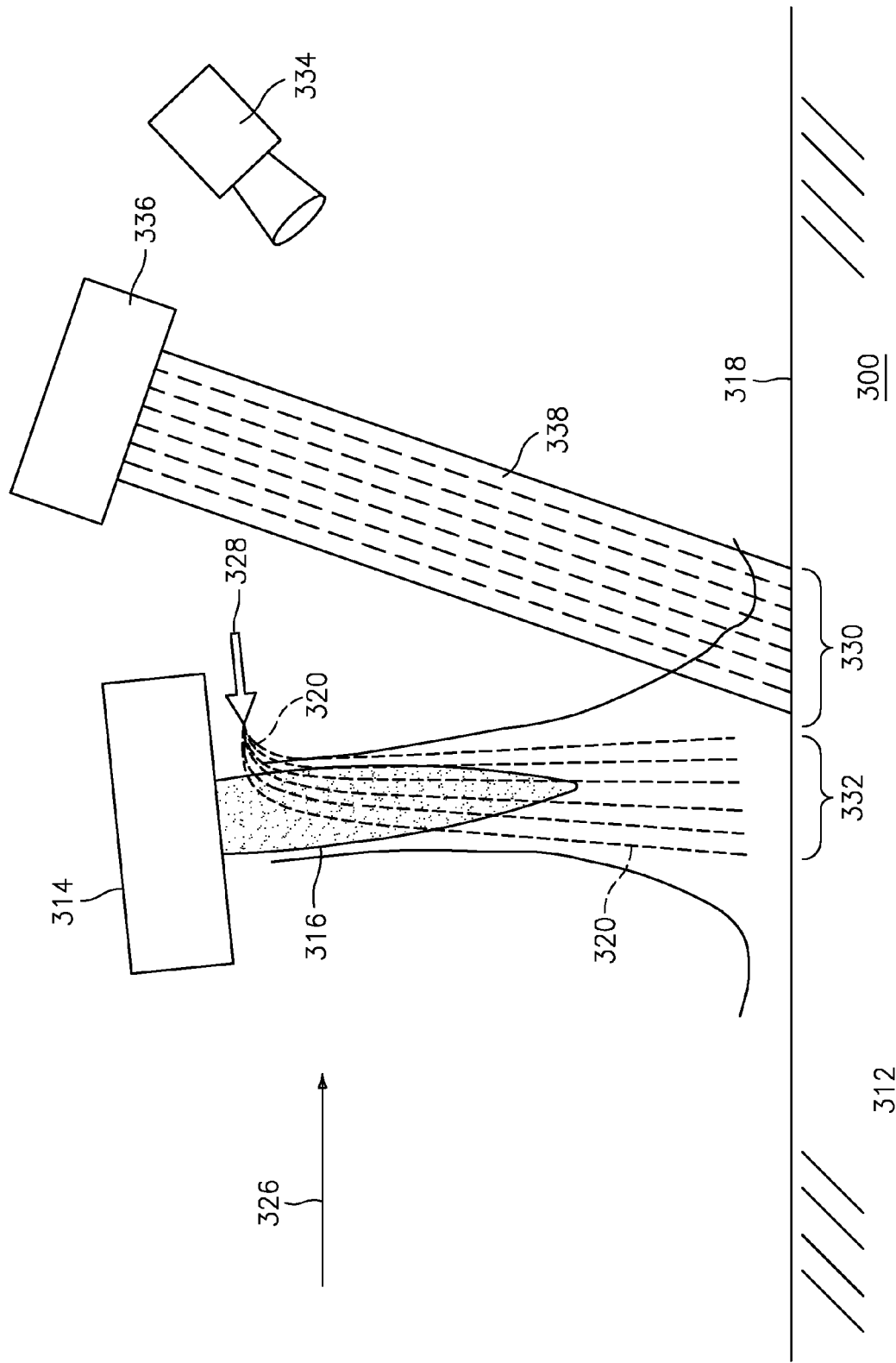
FIG. 5 is a representation of yet another embodiment of a system for applying a ceramic spray coating of the present invention.

Referring now to FIGS. 4 and 5, two alternative embodiments of the system illustrated in FIG. 3 are depicted. Referring specifically now to FIG. 4, a substrate 200 may move in a direction indicated by an arrow 212. A plasma torch apparatus 214 may remain stationary or may move in a direction opposite that of substrate 200 as indicated by an arrow 226, and emit a plasma plume 216. Once the optional bond coat layer has been applied, a ceramic (or powdered) material feeder (not shown) injects a quantity of ceramic material 220 in a direction indicated by an arrow 228 into plasma plume 216. The direction of the injected ceramic material 220 is preferably the same as the movement of substrate 200 and opposite that of any movement of plasma torch apparatus 214. Ceramic material 220 becomes entrained within plasma plume 216 and is carried towards surface 218.

One or more heat sources 236 may be utilized to preheat the surface area 230 lying in front of a ceramic material deposition area 232. Heat sources 236 may have a power rating sufficient to emit a heat beam 238 upon a substrate surface 218, that is, heated area 230, in order to raise and equilibrate the temperature of substrate 200 and coating layers surrounding a ceramic material deposition area 232 to prevent and/or lessen thermal gradients and shrinkage. Heat sources 236 may be oriented at a distance and at an angle sufficient to ensure the temperatures of substrate 200 and coating layers are equilibrated prior to the initial deposition or re-deposition of ceramic material 220. Heat sources 236 may comprise any radiant or convective heat source known to one of ordinary skill in the art. Representative heat sources may include, but are not limited to, a plasma or combustion thermal spray torch such as a 3MB® or Diamond Jet torch commercially available from Sulzer-Metco, Westbury, N.Y.; a combustion heater or torch; radiant resistive heat sources such as incandescent, conventional or halogen lamps; laser heat sources, combinations comprising at least one of the foregoing heat sources, and the like.

As contemplated earlier, a monitoring device 234 may be employed to measure the temperature of surface 218 throughout the deposition process. Suitable monitoring devices include but are not limited to infra-red cameras, optical pyrometers, thermocouples, combinations comprising at least one of the foregoing, and the like. Monitoring device 234 may provide data concerning the substrate and surface temperatures to an operator, a PLC, an open loop control in combination with passive process controls, or a computer controlling the automated deposition process as described earlier, etc.

Referring specifically now to FIG. 5, a substrate 300 may move in a direction indicated by an arrow 312. A plasma torch apparatus 314 may remain stationary or may move in a direction opposite that of substrate 300 as indicated by an arrow 326, and emit a plasma plume 316. Once the optional bond coat layer has been applied, a ceramic (or powdered) material feeder (not shown) injects a quantity of ceramic material 320 in a direction indicated by an arrow 328 into plasma plume 316. The direction of the injected ceramic material 320 is preferably the same as the movement of substrate 300 and opposite that of any movement of plasma torch apparatus 314. Ceramic material 320 becomes entrained within plasma plume 316 and is carried towards surface 318.

As described above, one or more heat sources 336 may be utilized to preheat the substrate surface area 330 lying in front of a ceramic material deposition area 332. In this alternative embodiment, heat source 336 may comprise a laser. Laser heat source 336 emits a laser beam 338 having a power rating or intensity sufficient to heat an area 330 of a substrate or coating surface 318 in order to raise the temperature of coating layers surrounding a ceramic material deposition area 332 to prevent and/or lessen thermal gradients and to cause surface expansion relative to the substrate sufficient to substantially close existing through thickness cracks in the coating. Laser heat source 336 may be oriented at a distance and at an angle sufficient to ensure the temperatures of coating layers are sufficiently elevated prior to the initial deposition or re-deposition of ceramic material 320. Representative laser heat sources may include but are not limited to laser heat sources employed in welding and cutting applications as known in the art.

As contemplated earlier, a monitoring device 334 may be employed to measure the temperature of surface 318 throughout the deposition process. Suitable monitoring devices include but are not limited to infra-red cameras, optical pyrometers, thermocouples, combinations comprising at least one of the foregoing, and the like. Monitoring device 334 may provide data concerning the substrate surface temperatures directly to an operator controlling the automated deposition process or provide such data to the automated system described above, etc.

Figure 6:
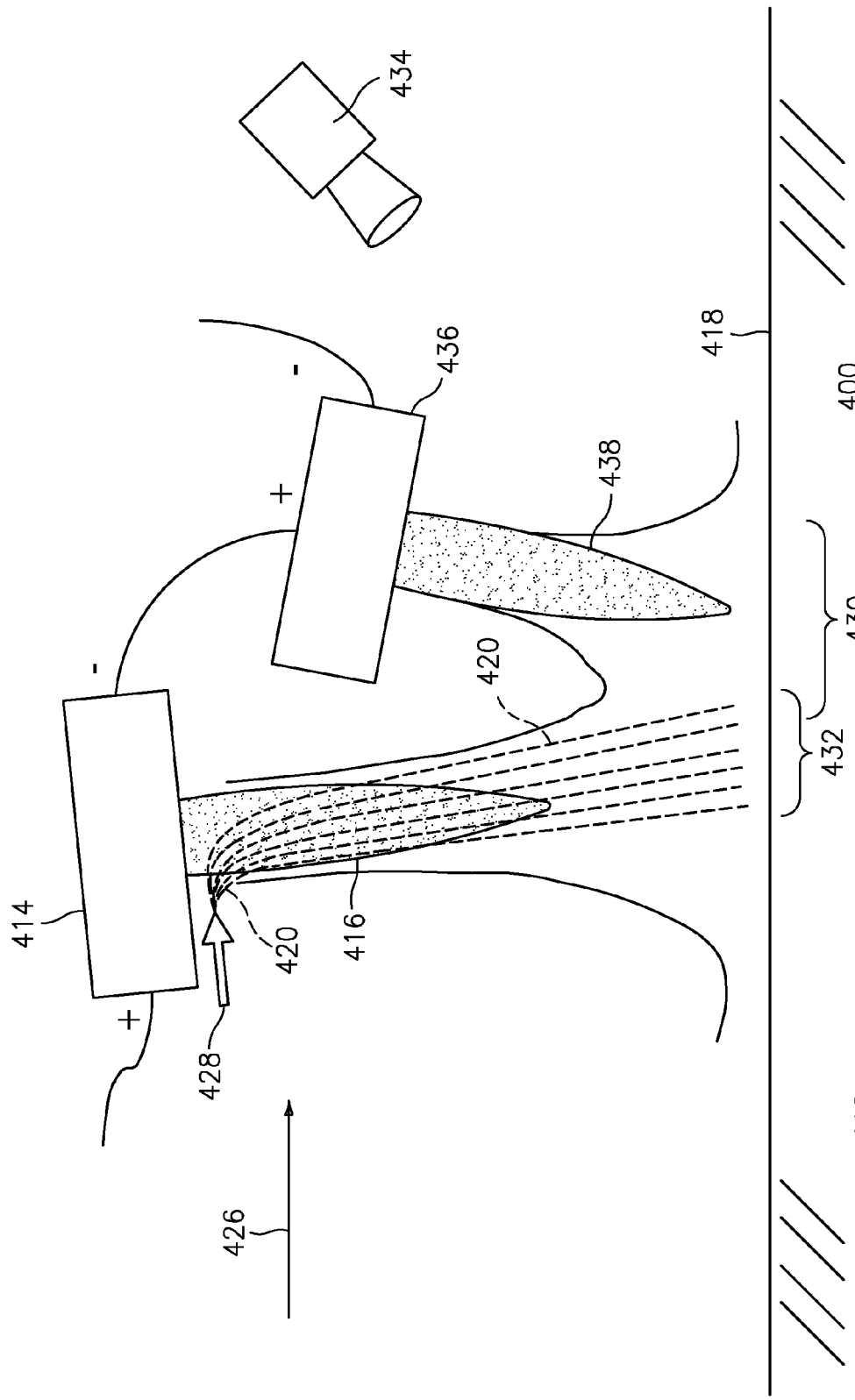
FIG. 6 is a representation of yet another embodiment of a system for applying a ceramic spray coating of the present invention.

Referring now to FIG. 6, yet another alternative embodiment of the system illustrated in FIG. 3 is depicted. A substrate 400 may move in a direction indicated by an arrow 412. A first plasma torch apparatus 414 may remain stationary or may move in a direction opposite that of substrate 400 as indicated by an arrow 426 and emit a plasma plume 416. One or more heat sources, and preferably a second plasma torch apparatus 436, may be utilized to preheat the existing coating surface area, that is, a heated area 430, lying in front of a ceramic material deposition area 432. Second plasma torch apparatus 436 emits a second plasma plume 438 upon surface 418, that is, heated area 430, in order to raise the temperature of coating layers surrounding a ceramic material deposition area 432 to cause thermal gradients and expansion of the surface. Second plasma torch apparatus 436 may be connected in series with first plasma torch apparatus 414 (as shown) or, in the alternative, may be powered independently and controlled by an operator, a PLC, an open loop control in combination with passive process controls, or a computer controlling the automated deposition process as described earlier. Torch apparatus 414 and 436 heat the surface of the existing coating layers to expand the coating material and close the through thickness cracks therein. Torch apparatus 436 may primarily heat the surface of the existing coating layers to expand the coating material and close the through thickness cracks on the surface. Once the optional bond coat layer has been applied, a ceramic (or powdered) material feeder (not shown) injects a quantity of ceramic material 420 in a direction indicated by an arrow 428 into plasma plume 416. Ceramic material 420 becomes entrained within plasma plume 416 and is carried towards surface 418.

By controlling the gas flow for both first and second plasma torch apparatus 414 and 436 the respective plasma plumes 416, 438 may be stretched out independently to achieve a high heat transfer rate to surface 418. To achieve this effect, second plasma torch apparatus 436 may be oriented at a distance and at an angle sufficient to ensure the temperatures of coating layers are heated, causing sufficiently high thermal gradients and expansion prior to the deposition of ceramic material 420. Second plasma torch apparatus 436 may be placed at a distance closer to surface 418 of substrate 400 than first plasma torch apparatus 414 so that second plasma plume 438 may preheat surface 418 and any coating layers already present. First plasma torch apparatus 414 and second plasma torch apparatus 436 may comprise any plasma torch known to one of ordinary skill in the art. One representative plasma torch may include but is not limited to an air plasma spray gun such as the 3MB® commercially available from Sulzer Metco, Inc., Westbury, N.Y.

As contemplated earlier, a monitoring device 434 may be employed to measure the temperature of surface 418 throughout the deposition process. Suitable monitoring devices include but are not limited to infra-red cameras, optical pyrometers, thermocouples, combinations comprising at least one of the foregoing, and the like. Monitoring device 434 may provide data concerning the coating surface temperatures to an operator, a PLC, an open loop control in combination with passive process controls, or a computer controlling the automated deposition process as described earlier, etc.

The processing parameters of the methods contemplated herein are controlled to produce vertical segmentation (approximately perpendicular to the bond coat surface) and are specific to variables such as gun type and fixture geometry. In general, it is known that a close gun-to-part spray distance coupled with relatively high power deposition results in desirable vertical segmentation of between about 4 and about 20 microcracks per inch. One of ordinary skill in the art would appreciate that the parameters may vary with the use of a different spray gun, substrate and/or fixture. Accordingly, the parameters set forth herein may be used as a guide for selecting other suitable parameters for different operating conditions.

In embodiments, during the spray deposition of the ceramic material, a cylindrical fixture comprising a diameter of about 38 inches may rotate at a speed between about 5 revolutions per minute (rpm) and about 100 rpm, and preferably at about 25 rpm. The plasma spray gun may be located in the interior of the hollow cylindrical fixture. The gun to part angle during individual part coating may be between about 60 degrees and about 120 degrees, and in some embodiments may be about 90 degrees. The gun-to-part distance may be varied from about 2 inches (0.05 m) to about 5 inches (0.13 m), and in some embodiments may be about 3.25 inches (0.083 m) during production of the ceramic layers. This close gun distance may be necessary for achieving satisfactory vertical segmentation. Gun traverse rate axially across the rotating fixture and substrates during deposition may be between about 0.05 inch/Revolution of the fixture (0.0013 meters/rev.) and about 1 in/Rev. (0.03 m/min), and in some embodiments may be about 0.2 in/Rev. (0.05 m/Rev.).

Ceramic material feed rate may be between about 15 grams/minute and about 300 grams/min, and in some embodiments may be about 90 grams/min. Carrier gas flow, such as nitrogen, may be used to maintain the powder under pressure and facilitate powder feed. The flow rate may be between about 5 scfh (standard cubic feet/hour) (0.14 scmh (standard cubic meters/hour)) and about 20 scfh (0.57 scmh), and in some embodiments may be about 11 scfh (0.31 scmh). Standard conditions are herein defined as about room temperature (20° C.) and about one atmosphere of pressure (101 kiloPascals). Primary gas flow, such as nitrogen gas, in the gun may be between about 60 scfh (1.70 scmh) and about 175 scfh (4.96 scmh), and in some embodiments may be about 100 scfh (2.83 scmh). Similarly, secondary gas flow, such as hydrogen, in the gun may be between about 5 scfh (0.14 scmh) and about 30 scfh (0.85 scmh), and in some embodiments may be about 18 scfh (0.51 scmh). Gun voltage may be between about 60 volts and about 80 volts, and in some embodiments may be about 75 volts. Similarly, gun amperage may be between about 500 amps and about 900 amps, and in some embodiments may be about 700 amps. In light of the process parameters described herein, one skilled in the art will appreciate that the parameters are dependent on variables, including but not limited to, powder type, powder size and especially the type of gun being employed, the relative speeds and motions, and the method(s) of surface preheating employed.

The systems and methods of the present invention facilitate the independent control of coating deposition and crack formation. The systems and methods described herein control the thermal gradients responsible for crack formation by measuring and controlling the variables that directly influence crack formation, and may use an auxiliary heat source to permit independent control of spray and cracking variables. The independent control of both crack structure and coating porosity can be achieved by varying chemical compositions, porosity, and crack structure to achieve the desired thermal conductivity, erosion resistance, abradability, density, and other related crack structure and coating characteristics.

It is to be understood that the invention is not limited to the illustrations described and shown herein, which are deemed to be merely illustrative of the best modes of carrying out the invention, and which are susceptible to modification of form, size, arrangement of parts, and details of operation. The invention rather is intended to encompass all such modifications which are within its spirit and scope as defined by the claims.

What is claimed is:

1. A method of forming a segmented ceramic spray coating on a substrate, comprising:

providing one or more heat sources disposed proximate to a substrate;

depositing a quantity of a first ceramic material into a heat stream of said one or more heat sources and onto a deposition area of a surface of said substrate to form by thermal spraying a first ceramic material layer;

depositing one or more quantities of additional ceramic material into said heat stream to form by thermal spraying one or more additional layers of ceramic material;

as movement of the substrate relative to the one or more heat sources moves the deposition area along the substrate, in advance of said depositing said one or more quantities of additional ceramic material, applying said heat stream to preheat without re-melt a thermal gradient zone located in front of a deposition area for one or more quantities of additional material to expand said first ceramic material and deposited said additional layers so that the depositing of said one or more quantities of additional ceramic material is onto a preheated expanded deposited material;

cooling said one or more additional layers of ceramic materials to promote vertical crack propagation of existing cracks therein.

2. The method of claim 1, wherein the applying of the heat stream to said preheated thermal gradient zone, the depositing of one or more additional quantities, and the cooling are repeated one or more times.

3. The method of claim 1, wherein said applying said heat stream to preheat said thermal gradient zone comprises applying said heat stream using one or more said heat sources in addition to the one or more said heat sources into which the quantities of additional ceramic material are deposited.

4. The method of claim 3, wherein applying said heat stream comprises applying said heat stream using two heat sources.

5. The method of claim 1, further comprising monitoring a temperature of said first ceramic material layer and said one or more additional layers of ceramic material.

6. The method of claim 1, wherein said heat source is selected from the group consisting of a plasma thermal spray torch, a combustion thermal spray torch, a combustion heater, a combustion torch, radiant resistive heat sources, incandescent lamps, halogen lamps and combinations thereof.

7. The method of claim 1, further comprising applying a bondcoat material prior to the depositing of the first ceramic material.

8. The method of claim 1, further comprising:

depositing a quantity of a bond coat material into a heat stream of said one or more heat sources and onto a deposition area of a surface of said substrate to form a bond coat layer prior to the depositing of the first ceramic material.

9. The method of claim 1, wherein:

coating surface temperature is monitored and operation of the one or more heat sources are controlled so as to promote said vertical propagation of existing cracks through the one or more additional layers of ceramic materials.

10. The method of claim 9, wherein there is independent control of:

a first of said one or more heat sources associated with the thermal spraying; and an auxiliary of said one or more heat sources used for the preheat of the thermal gradient zones of said first ceramic material layer and said one or more additional layers but not for said thermal spraying of said first ceramic material and said additional ceramic material.

* * * * *